US011220251B2

United States Patent
Du et al.

(10) Patent No.: US 11,220,251 B2
(45) Date of Patent: Jan. 11, 2022

(54) DETECTION OF A FRICTION BRAKE FAULT

(71) Applicant: GM Global Technology Operations LLC, Detroit, MI (US)

(72) Inventors: Xinyu Du, Oakland Township, MI (US); Dongyi Zhou, Sterling Heights, MI (US); Mutasim A. Salman, Rochester Hills, MI (US); Kevin A. Cansiani, Detroit, MI (US); Xiaoyu Huang, Troy, MI (US); Wen-Chiao Lin, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 70 days.

(21) Appl. No.: 16/013,203

(22) Filed: Jun. 20, 2018

(65) Prior Publication Data
US 2019/0389446 A1    Dec. 26, 2019

(51) Int. Cl.
*B60T 17/22* (2006.01)
*B60T 13/66* (2006.01)

(52) U.S. Cl.
CPC .......... *B60T 17/226* (2013.01); *B60T 13/662* (2013.01); *B60T 17/221* (2013.01)

(58) Field of Classification Search
CPC .... B60T 13/662; B60T 17/221; B60T 17/226; B60T 8/00
See application file for complete search history.

(56) References Cited

U.S. PATENT DOCUMENTS

| 6,322,160 | B1* | 11/2001 | Loh | B60T 8/42 |
| | | | | 303/87 |
| 7,695,075 | B1* | 4/2010 | Mackiewicz | B60T 8/173 |
| | | | | 303/191 |
| 2004/0178675 | A1* | 9/2004 | Kamiya | B60T 8/172 |
| | | | | 303/191 |

(Continued)

OTHER PUBLICATIONS

Leslie, A. C., "Mathematical Model of Brake Caliper to Determine Brake Torque Variation Associated with Disc Thickness Variation (DTV) Input", 2004 (Year: 2004).*

*Primary Examiner* — Hunter B Lonsberry
*Assistant Examiner* — Matthew J. Reda
(74) *Attorney, Agent, or Firm* — Quinn IP Law (57) ABSTRACT

A method of identifying a fault in a friction brake actuated by hydraulic brake pressure and configured to decelerate a vehicle road wheel includes detecting, via a first sensor, a vibration at the road wheel and communicating data indicative of the detected vibration to a controller. The method additionally includes detecting, via a second sensor, upon application of the hydraulic brake pressure, a hydraulic brake pressure variation and communicating data indicative of the detected hydraulic brake pressure variation. The method additionally includes comparing, via the controller, the data indicative of the detected vibration with a threshold vibration value and the data indicative of the detected hydraulic brake pressure variation with a threshold hydraulic brake pressure value. Furthermore, the method includes generating a sensory signal indicative of the brake fault when magnitudes of the detected vibration and the detected hydraulic brake pressure variation are greater than their respective threshold values.

20 Claims, 4 Drawing Sheets

(56) References Cited

U.S. PATENT DOCUMENTS

| | | | |
|---|---|---|---|
| 2006/0202555 A1* | 9/2006 | Kingston | B60T 8/268 |
| | | | 303/191 |
| 2006/0253282 A1* | 11/2006 | Schmidt | G07C 5/0808 |
| | | | 704/233 |
| 2014/0052339 A1* | 2/2014 | Takahashi | B60T 13/686 |
| | | | 701/41 |
| 2016/0245351 A1* | 8/2016 | Johnson | B60T 8/173 |
| 2017/0324817 A1* | 11/2017 | Oliveira | H04L 67/10 |
| 2019/0195628 A1* | 6/2019 | Lam | G01B 21/30 |
| 2019/0202426 A1* | 7/2019 | Baehrle-Miller | B60T 13/588 |
| 2020/0016943 A1* | 1/2020 | Godet | B60C 23/0416 |

\* cited by examiner

DETECTION OF A FRICTION BRAKE FAULT

INTRODUCTION

The disclosure relates to detection of a friction brake fault in a motor vehicle.

A brake is typically a mechanical device designed to inhibit motion. Brakes commonly use friction to convert kinetic energy into heat, though other methods of energy conversion may be employed. For example, regenerative braking converts much of the kinetic energy to electric energy, which may be stored for later use.

On vehicles, braking systems are employed to apply a retarding force, typically via frictional elements at the vehicle's rotating axles or wheels, to inhibit vehicle motion. Friction brakes often include stationary shoes or pads that are lined with friction material and configured to be engaged with a rotating wear surface, such as a rotor or a drum. Common configurations include shoes that contact to rub on the outside of a rotating drum, commonly called a "band brake", a rotating drum with shoes that expand to rub the inside of a drum, commonly called a "drum brake", and pads that pinch a rotating disc, commonly called a "disc brake".

Modern vehicles typically use a hydraulic force to press the aforementioned shoes or pads against the respective rotating disc or drum, which slows the disc or drum and its attendant wheel. Generally, vehicle friction brakes absorb thermal energy and store the energy mainly in the brake disc or brake drum while the brakes are being applied, and then gradually transfer the stored heat to the ambient. Accordingly, during extended brake applications, which may occur when vehicle motion is retarded from elevated speeds, the drums or rotors, as well as respective shoes or pads, may experience extensive accumulation of heat. Occasionally, such build up of heat may lead to distortion in the geometric form of respective brake components, and generate noise vibration and harshness (NVH) concerns in the host vehicle.

SUMMARY

A method of identifying a fault in a friction brake actuated by hydraulic brake pressure and configured to decelerate a road wheel of a vehicle having a vehicle body and an electronic controller includes detecting via a first sensor in communication with the electronic controller a vibration at the road wheel. The method also includes communicating, by the first sensor to the controller, data indicative of the detected vibration. The method additionally includes detecting via a second sensor in communication with the controller, upon application of the hydraulic brake pressure, a variation in the hydraulic brake pressure. The method also includes communicating, by the second sensor to the controller, data indicative of the detected variation in the hydraulic brake pressure. The method additionally includes comparing, via the controller, the data indicative of the detected vibration with a threshold vibration value, and the data indicative of the detected variation in the hydraulic brake pressure with a threshold hydraulic brake pressure value. Furthermore, the method includes generating, via the controller, a sensory signal indicative of the fault in the friction brake when a magnitude of the detected vibration is greater than the threshold vibration value and a magnitude of the detected variation in the hydraulic brake pressure is greater than the threshold hydraulic brake pressure value.

The method may also include detecting a rotational speed of the road wheel via a third sensor in communication with the controller, and communicating, by the third sensor to the controller, the data indicative of the detected rotational speed of the road wheel.

The method may additionally include removing, via the controller, a trend from the data indicative of the detected vibration via a dynamic moving average filter using the data indicative of the detected rotational speed of the road wheel.

Following removing the trend from the data indicative of the detected vibration, the method may use a fast Fourier transform (FFT) algorithm to assess the data indicative of the detected vibration in a frequency domain.

The method may also include removing, via the controller, a trend from the data indicative of the variation in the hydraulic brake pressure via a dynamic moving average filter using the data indicative of the detected rotational speed of the road wheel.

The vehicle body may define a vehicle interior. In such an embodiment, the method may include detecting a noise either externally to the vehicle body or in the vehicle interior, via a fourth sensor in communication with the controller. The method may also include communicating, by the fourth sensor to the controller, data indicative of the detected noise, and identifying, via a machine learning technology, when the detected noise is generated by the fault in the friction brake. The fourth sensor may be arranged either within the vehicle interior or externally on the vehicle body.

Each of detecting the vibration at the road wheel, detecting the variation in the hydraulic brake pressure, detecting the rotational speed of the road wheel, and detecting the noise may be accomplished both before and after an initial application of the hydraulic brake pressure and engagement of the friction brake.

The data indicative of the detected variation in the hydraulic brake pressure and the data indicative of the detected vibration at the road wheel may be respective steady state variation data and steady state vibration data communicated to the controller after the initial application of the hydraulic brake pressure.

The controller may be a vehicle on-board electronic control unit (ECU), and wherein the generated sensory signal is communicated via the ECU to one of a vehicle infotainment system, an external controller, and an information technology (IT) cloud platform.

The vehicle may have a plurality of road wheels, and the friction brake may be part of a vehicle brake system including a plurality of friction brakes. In such an embodiment, each friction brake may be configured to decelerate a respective one of the road wheels. Furthermore, the method may additionally include identifying the friction brake having the fault among the plurality of friction brakes via comparing the detected vibration with the threshold vibration value and the data indicative of the detected variation in the hydraulic brake pressure with the threshold hydraulic brake pressure value for each of the plurality of friction brakes.

A vehicle having an electronic controller configured or programmed to execute such a method is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
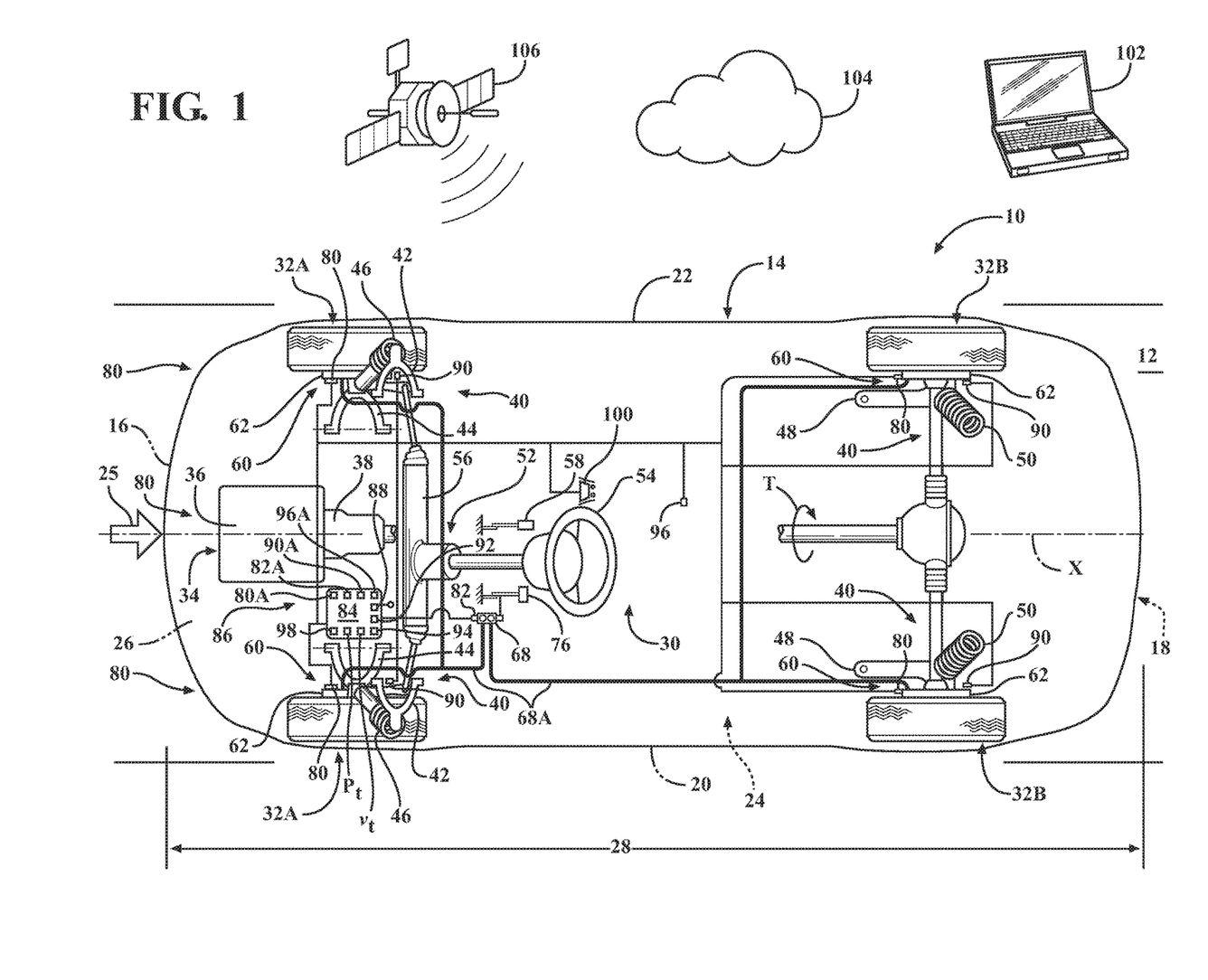
FIG. 1 is a schematic plan view of a motor vehicle having a friction brake subassembly at each road wheel and employing a system for detection of a fault in such friction brakes according to the disclosure.

Referring to the drawings, wherein like reference numbers refer to like components, FIG. 1 shows a schematic view of a motor vehicle 10 positioned relative to a road surface 12. The vehicle 10 could be a mobile platform, such as a passenger vehicle, an ATV, an airplane, etc., used for personal, commercial, or industrial purpose.

As shown, the vehicle 10 includes a vehicle body 14 having a longitudinal axis X. The vehicle body 14 defines six body sides. The six body sides include a first body end or front end 16, an opposing second body end or rear end 18, a left side 20, a right side 22, a top body section 24, which frequently includes a vehicle roof, and an underbody section 26 configured to span a distance 28 between the front and rear ends 16, 18 of the body 14. As shown in FIG. 1, the front end 16 is configured to face oncoming or incident, i.e., approaching and contacting, ambient airflow 25, for example when the vehicle 10 is in forward motion relative to the road surface 12.

Figure 3:
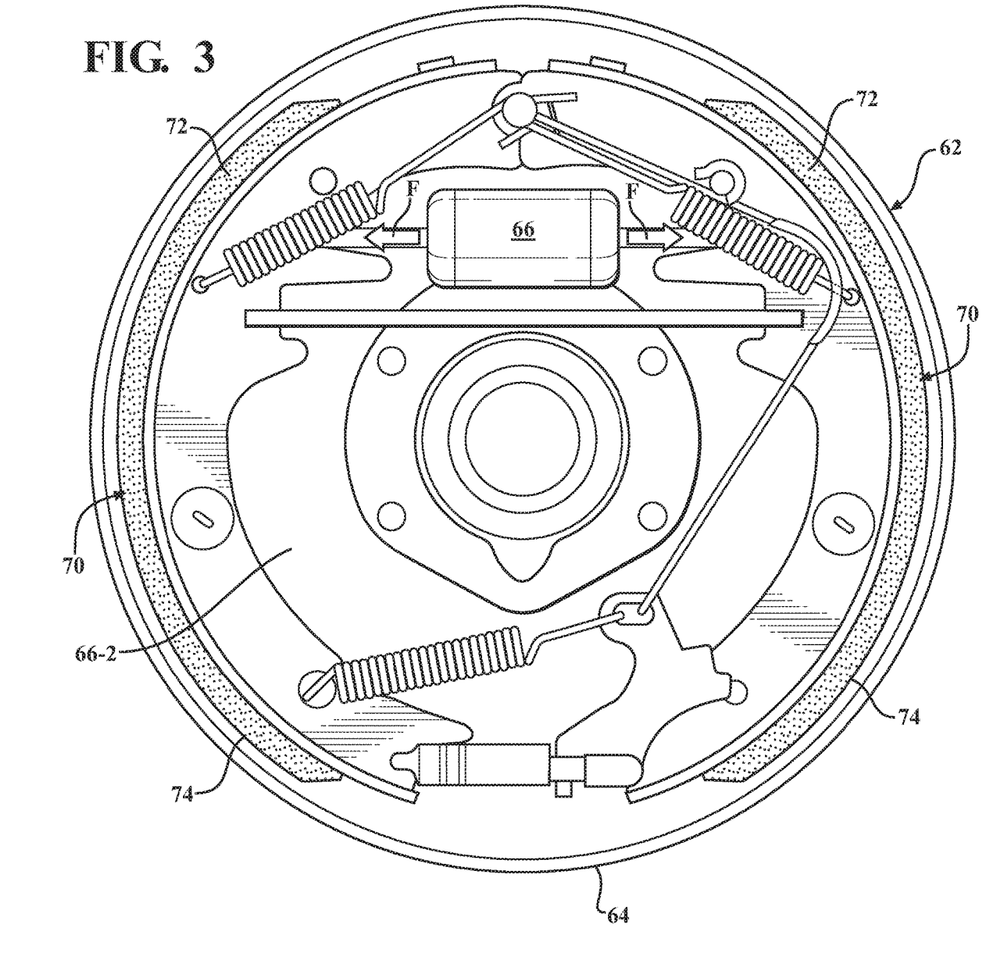
FIG. 3 is a schematic side view of a drum brake embodiment of the brake subassembly shown in FIG. 1.

With continued reference to FIG. 1, the vehicle body 14 additionally defines a vehicle interior 30, configured to accommodate a vehicle operator, passengers, and cargo. With reference to FIGS. 1 and 3, the vehicle 10 includes a plurality of road wheels, specifically front wheels 32A and rear wheels 32B, and a powertrain 34 that may include an internal combustion engine 36 for generating engine torque T. The powertrain 34 may also include a transmission 38 operatively connecting the engine 36 to at least some of the road wheels 32A, 32B for transmitting engine torque T thereto. The powertrain 34 may additionally include a fuel cell and/or one or more electric motor-generators (not shown) operatively connected to at least some of the road wheels 32A and 32B.

As shown in FIG. 1, a vehicle suspension system 40 operatively connects the body 14 to the respective road wheels 32A and 32B for maintaining contact between the wheels and the road surface 12, and for maintaining handling of the vehicle 10. The suspension system 40 may include an upper control arm 42, a lower control arm 44, and a strut 46 connected to each of the front wheels 32A. The suspension system 40 may also include a trailing arm 48 and a spring 50 connected to each of the rear wheels 32B. Although a specific configuration of the suspension system 40 is shown in FIG. 1, other vehicle suspension designs are similarly envisioned.

As also shown in FIG. 1, a vehicle steering system 52 is operatively connected to the front wheels 32A for steering the vehicle 10. The steering system 52 includes a steering wheel 54 that is operatively connected to the front wheels 32A via a steering rack 56. The steering wheel 54 is arranged inside the passenger compartment of the vehicle 10, such that an operator of the vehicle may command the vehicle to assume a particular direction with respect to the road surface 12. Additionally, an accelerator pedal 58 is positioned inside the passenger compartment of the vehicle 10, wherein the accelerator pedal is operatively connected to the powertrain 34 for commanding propulsion of the vehicle 10.

A vehicle braking system 60 is operatively connected to the respective front and rear wheels 32A, 32B for retarding rotation of the wheels and decelerating the vehicle 10. The braking system 60 includes a friction brake subassembly, or friction brake, 62 arranged at each of the respective front and rear wheels 32A, 32B and operatively connected to the vehicle suspension system 40. In other words, the braking system 60 may include a plurality of friction brake subassemblies 62. Each brake subassembly 62 may be configured as either a disc brake (shown in FIG. 2) or a drum brake (shown in FIG. 3). Each brake subassembly 62 includes a rotor 64 configured for synchronous rotation with the respective wheel 32A or 32B about an axis Y. Rotor material is generally selected for advantageous friction and wear characteristics, as well as effective heat resistance. Typically, rotors are formed out of cast iron, but may in some cases be made of composites such as reinforced carbon-carbon or ceramic matrix composites. Each brake subassembly 62 additionally includes an actuator 66, such as a hydraulically actuated piston arranged in a brake caliper 66-1 of a disc brake (shown in FIG. 2) or in a foundation 66-2 of a drum brake (shown in FIG. 3), and configured to generate an actuator or brake force F. Specifically, each actuator 66 is operated via hydraulic brake pressure P generated at a master brake cylinder 68 and delivered via hydraulic brake lines 68A (shown in FIG. 1). For example, a typical pressure P value generated at the master brake cylinder 68 during a 0.3 g stop of the vehicle from 60 mph is 15-20 Bar.

Figure 2:
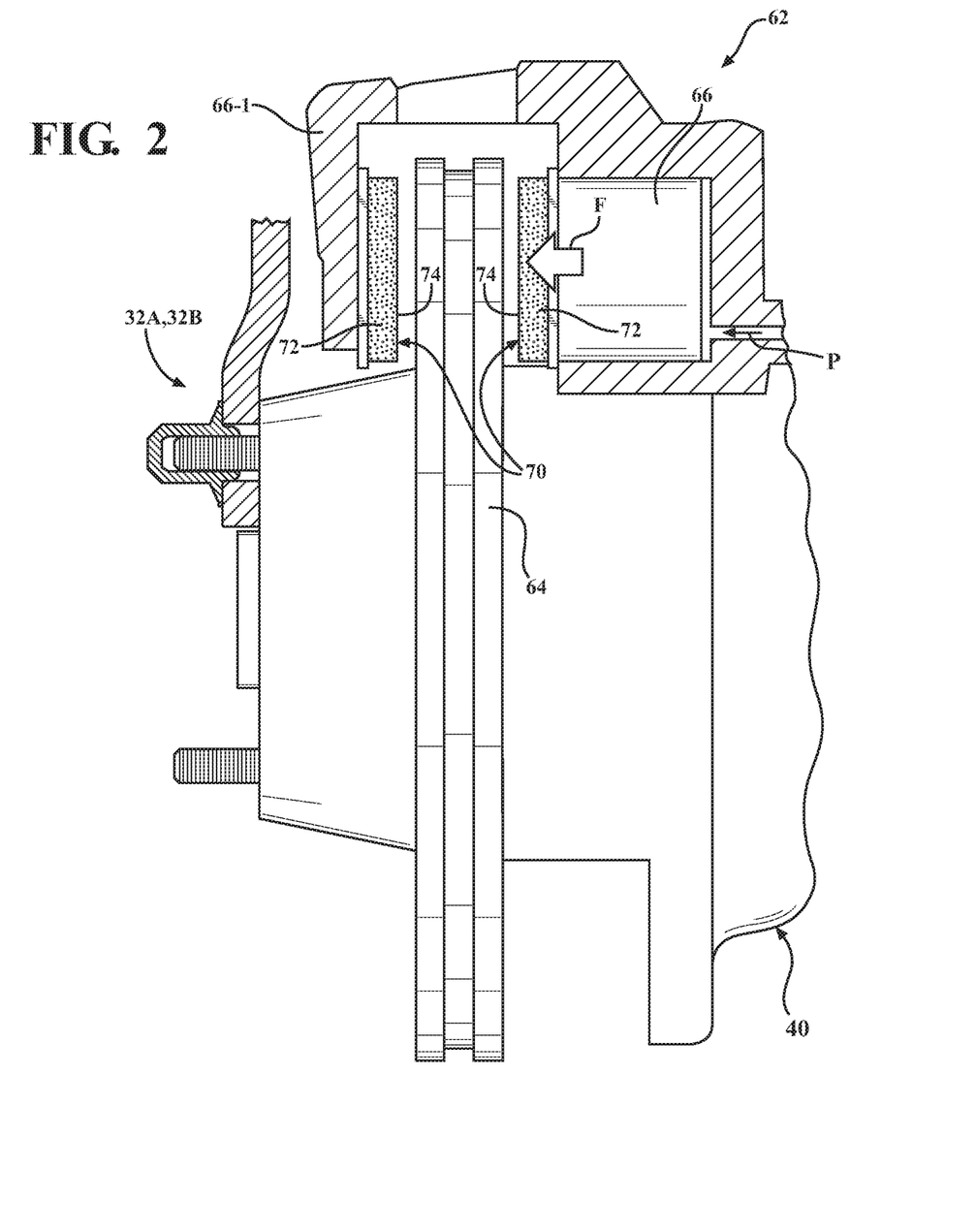
FIG. 2 is a schematic cross-sectional view of a disc brake embodiment of the brake subassembly shown in FIG. 1, wherein the brake subassembly is configured as a disc brake.

As shown in FIGS. 2 and 3, each brake subassembly 62 also includes a brake component 70 having a wearable friction lining or segment 72. The friction segment 72 additionally includes a friction surface 74 that becomes pressed into contact with the rotor 64 by the actuator force F for retarding rotation of the respective wheel 32A or 32B. Typically, friction segments are composed of relatively soft but tough and heat-resistant materials having a high coefficient of dynamic friction, and, ideally an identical coefficient of static friction. The friction segment 72 is the portion of the brake subassembly 62 which converts the vehicle's kinetic energy into thermal energy that is initially largely absorbed by the rotor 64 and subsequently given off via radiation and/or convection to the ambient. Such absorption of thermal energy may cause excessive wear on the friction segment 72 and the rotor 64, thermally induced dimensional distortion of the rotor, noise vibration and harshness (NVH) concerns in the vehicle 10, and brake fade, i.e., a decrease in the brake's stopping power.

The complete brake component 70 (including the friction segment 72) is typically called a "brake pad" or "brake shoe". As shown in FIG. 2, if the brake subassembly 62 is configured as a disc brake, the rotor 64 is configured as a disc rotor and the brake component 70 is correspondingly configured as a disc brake pad. As shown in FIG. 3, if the brake subassembly 62 is configured as a drum brake, the rotor 64 is configured as a brake drum and the brake component 70 is correspondingly configured as a drum brake shoe.

As shown in FIG. 2, in a disc brake, the caliper 66-1 is generally configured to hold a pair of braking components 70, i.e., brake pads, relative to the rotor 64, i.e., disc rotor, and apply the actuator force F to the brake pads in order to squeeze the disc rotor for decelerating the vehicle 10. As shown in FIG. 3, in a drum brake, a pair of brake components 70, i.e., brake shoes, are generally held inside the rotor 64, i.e., drum, and the actuator 66 applies the actuator force F to press the brake shoes against a perimeter of the inner surface of the drum to decelerate the vehicle 10. Additionally, in each case, of disc and drum brakes of FIGS. 2 and 3, respectively, the actuator force F may be controlled via a brake pedal 76 operating the master brake cylinder 68 (shown in FIG. 1). The brake pedal 76 is positioned inside the passenger compartment of the vehicle 10, and is adapted to be controlled by the operator of the vehicle. Alternatively, the actuator force F may be controlled via an onboard or an external computer (not shown).

The vehicle 10 also includes a plurality of first sensors 80. Each such first sensor 80 may be part of an individual inertial measurement unit (IMU) and is configured to detect a vibration v, for example characterized as longitudinal acceleration, at one of the road wheel 32A, 32B. Alternatively, the IMU may be employed to measure longitudinal acceleration at the center of gravity location in the vehicle 10. Each of the first sensors 80 generally detects the vibration v at a particular road wheel 32A, 32B over a first span of time $t_1$. When the detected vibration v exceeds a certain magnitude, the vibration will typically also be transmitted as feedback to the brake pedal 76 and may be sensed by the vehicle operator. The vehicle 10 also includes at least one second sensor 82, such as a pressure sensor, configured to detect a variation in the hydraulic brake pressure P. The second sensor 82 generally detects the variation in the hydraulic brake pressure P over a second span of time $t_2$. The second sensor 82 may be specifically configured to detect variation in the hydraulic brake pressure P at or proximate the master brake cylinder 68 (shown in FIG. 1), or a plurality of second sensors 82 may be used to detect pressures at individual road wheel 32A, 32B, or anywhere along the span, both straight and curved sections, of hydraulic brake lines 68A used by the brake system 60 (not shown). The first span of time $t_1$ and the second span of time $t_2$ may have an equivalent value. The vehicle 10 also includes an electronic controller 84 in operative communication with each of the first sensor(s) 80 and the second sensor(s) 82. The first and second sensors 80, 82, and the controller 84 are each part of a system 86 (shown in FIG. 1) configured to identify a fault in the friction brake subassembly 62.

The controller 84 may be a vehicle 10 electronic control unit (ECU), i.e., on-board the vehicle 10, or a stand-alone, either on-board the vehicle or located external to the vehicle, electronic controller. The controller 84 includes a memory that is tangible and non-transitory. The memory may be a recordable medium that participates in providing computer-readable data or process instructions. Such a medium may take many forms, including but not limited to non-volatile media and volatile media. Non-volatile media used by the controller 84 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer. Memory of the controller 84 may also include a flexible disk, hard disk, magnetic tape, other magnetic medium, a CD-ROM, DVD, other optical medium, etc. The controller 84 may be equipped with a high-speed primary clock, requisite Analog-to-Digital (A/D) and/or Digital-to-Analog (D/A) circuitry, input/output circuitry and devices (I/O), as well as appropriate signal conditioning and/or buffer circuitry. Algorithms required by the controller 84 or accessible thereby may be stored in the memory and automatically executed to provide the required functionality.

The controller 84 is configured, i.e., structured and programmed, to operate the system 86 for identifying a fault in the friction brake subassembly 62, and specifically in the rotor 64. Specifically, the electronic controller 84 is configured to receive a signal 80A from the first sensor 80 data indicative of the detected vibration v at the road wheels 32A, 32B. The electronic controller 84 is also configured to receive from the second sensor 82 a signal 82A communicating data indicative of the detected variation in the hydraulic brake pressure P. The controller 84 is intended to receive the data indicative of the detected variation in the hydraulic brake pressure P upon application of the brake force F and attendant buildup and stabilization of hydraulic brake pressure P used to engage the friction brake pad 70 with the rotor 64. The electronic controller 84 is additionally configured to compare the data indicative of the detected vibration v with a threshold vibration value $v_t$. The electronic controller 84 is furthermore configured to compare the data indicative of the detected variation in the hydraulic brake pressure P with a threshold hydraulic brake pressure value $P_t$. The electronic controller 84 is additionally configured to generate a sensory signal 88 (shown in FIG. 1) indicative of the fault in the friction brake subassembly 62 when a magnitude of the detected vibration v is greater than the threshold vibration value $v_t$ and a magnitude of the detected variation in the hydraulic brake pressure P is greater than the threshold hydraulic brake pressure value $P_t$. Accordingly, such a generated sensory signal 88 may be indicative or predictive of a decrease in the stopping power of the friction brake subassembly 62.

The vehicle 10, as part of the system 86, may additionally include at least one third sensor 90 (shown in FIG. 1). Each third sensor 90 may be arranged proximate a particular road wheel 32A, 32B, and configured to detect a rotational speed w of the respective road wheel. For its part, the controller 84 may be additionally configured to receive a signal 90A communicating data indicative of the detected rotational speed w of the road wheel 32A, 32B from the third sensor 90. The use of individual third sensors 90 located at each specific road wheel 32A, 32B may be used to identify the largest source of vibration, e.g., localize the responsible warped rotor 64, and thereby identify the root cause of the hydraulic brake pressure P variation detected via the second sensor 82. Additionally, the controller 84 may also be configured to remove a trend $T_v$ from the data indicative of the detected vibration v via a dynamic moving average filter 92 (shown in FIG. 1) programmed into the controller. The controller 84 may be specifically programmed to remove the trend $T_v$ using the data indicative of the detected rotational speed w of the road wheel 32A, 32B.

The controller 84 may be additionally configured to use an analytical approach to transform time domain data to frequency domain, such as a fast Fourier transform (FFT) algorithm. Such an FFT approach may, for example, be a notch filter or a short period of time FFT, to assess the data indicative of the detected vibration v of the particular road wheel 32A, 32B in a frequency domain. In general, Fourier analysis converts a signal from its original domain to a representation in the frequency domain and vice versa. FFT samples a signal over a period of time (or space) and divides it into its frequency components. FFT algorithm may generally be represented via the following mathematical expression:

$$STFT\{x[n]\}(m, \omega) \equiv X(m, \omega) = \sum_{n=-\infty}^{\infty} x[n]w[n-m]e^{-j\omega n}$$

An exemplary trend removal algorithm may be as follows:

$$x[n] = x[n] - \frac{\sum_{k=n-N}^{n+N} x[n]}{2N+1}$$

$2N+1$ may be equivalent to $\frac{\sqrt{0.196202} + f_{co}^2}{f_{co}}$ (wherein $f_{co}$ is a cut-off frequency)

Such assessment of the data indicative of the detected vibration v of the subject road wheel 32A, 32B is intended to be performed after removal of the trend $T_v$ from the data indicative of the detected vibration v. The controller 84 may be additionally configured to remove a trend $T_p$ from the data indicative of the variation in the hydraulic brake pressure P via a dynamic moving average filter 94 (shown in FIG. 1). The dynamic moving average filter 94 may be programmed into the controller 84. Analogous to the removal of the trend $T_v$, the controller 84 may be programmed to remove the trend $T_p$ using the data indicative of the detected rotational speed ω of the road wheel 32A, 32B. Additionally, identification of vibration of the particular road wheel 32A, 32B at wheel speed frequency and comparison to the hydraulic brake pressure P variation detected via the second sensor 82 may also enable to identify a specific warped rotor 64, as compared to an out-of-balance road wheel.

The threshold hydraulic brake pressure value $P_t$ may be set at an amplitude of 0.3 RMS, which may, for example, be indicative of the disc brake rotor 64 having an out-of-tolerance lateral run-out, i.e., being dimensionally warped, to 2.5 mm out of square. For comparison, a dimensionally within tolerance, i.e., acceptably square, rotor 64 may generate a hydraulic brake pressure value P having a maximum amplitude of 0.07 RMS. The threshold vibration value $v_t$ may be set at an amplitude of 0.05 RMS, which may be indicative of the rotor 64 being dimensionally warped to 2.5 mm out of square. For comparison, a dimensionally square rotor 64 may generate a vibration v having a maximum amplitude of 0.025 RMS.

The vehicle 10, as part of the system 86, may additionally include at least one fourth sensor 96 (shown in FIG. 1). Each fourth sensor 96 may be an acoustic sensor, such as a microphone arranged externally on the vehicle body 14 or in the vehicle interior 30 and in communication with the controller 84. The fourth sensor 96 is configured to detect a noise external to the vehicle body 14 or in the vehicle interior 30. For its part, the controller 84 may be additionally configured to receive, from the fourth sensor 96, a signal 96A communicating data indicative of the detected noise. Furthermore, the controller 84 may be configured to identify, via a machine learning technology, such as a specifically constructed and trained artificial neural network 98 (for example having a cellular neural network structure or long-short term memory), programmed into the controller, when the detected noise is generated by an actual fault in the friction brake subassembly 62.

The controller 84 may be configured to detect each of the vibration at the road wheel 32A, 32B, the variation in the hydraulic brake pressure P, the rotational speed ω of the respective road wheel, and the noise both before and after an initial application of the hydraulic brake pressure P signifying engagement of the friction brake subassembly 62, i.e., a brake event. The data indicative of the detected variation in the hydraulic brake pressure P and the data indicative of the detected vibration v at the specific road wheel 32A, 32B is intended to be respective steady state variation data and steady state vibration data received by the controller 84 after the initial application of the hydraulic brake pressure P. Accordingly, the controller 84 may be additionally programmed to select steady state variation data and steady state vibration data from the respective data received after the initial application of the hydraulic brake pressure P for comparing with the threshold vibration value $v_t$ and with the threshold hydraulic brake pressure value $P_t$.

The vehicle 10 may also include an on-board infotainment system 100, or a separate, stand-alone controller, operatively connected to an ECU embodiment of the controller 84. Additionally, an external controller 102 and/or an information technology (IT) cloud platform 104, as shown in FIG. 1, may be employed in communication with the ECU 84 for coordinating and managing operation of a fleet of vehicles 10. Generally, an IT cloud platform is a provider-managed suite of hardware and software. An IT paradigm enables universal access to shared pools of configurable system resources and higher-level services that may be rapidly provisioned with minimal management effort, often over the Internet. Furthermore, cloud computing relies on sharing of resources to achieve coherence and economies of scale, similar to a public utility. Each of the infotainment system 100, external controller 102, and IT cloud platform 104 may be part of the system 86. In such an embodiment, the ECU 84 may be specifically configured to communicate the generated sensory signal 88 to the infotainment system 100, the external controller 102, and/or the IT cloud platform 104. Appropriate communication between the ECU 84 and the external controller 102, and/or the IT cloud platform 104 may be accomplished via an earth-orbiting satellite 106 (shown in FIG. 1).

As described above, the friction brake subassembly 62 may be part of a vehicle brake system 60, which includes a plurality of friction brake subassemblies, and each friction brake is configured to decelerate a respective road wheel 32A, 32B. Accordingly, the controller 84 may be also configured to identify and thereby isolate the friction brake subassembly 62 having the detected fault among the plurality of friction brake subassemblies of the vehicle brake system 60. Such identification and isolation of a particular friction brake subassembly 62 is enabled by comparing the detected vibration v with a threshold vibration value $v_t$ and the data indicative of the detected variation in the hydraulic brake pressure P with the threshold hydraulic brake pressure value $P_t$ for each of the plurality of friction brake subassemblies in the brake system 60 of the vehicle 10.

Figure 4:
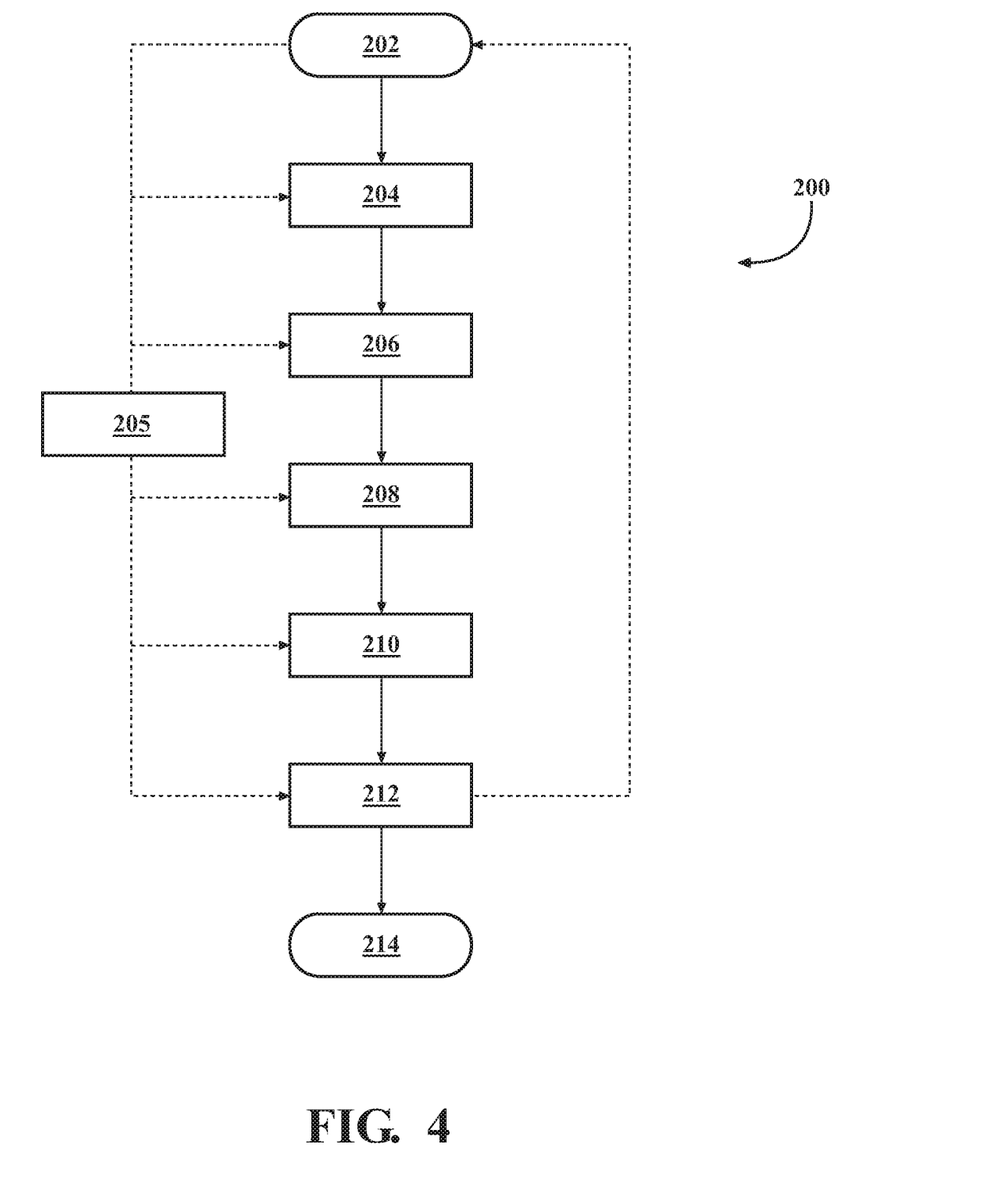
FIG. 4 is a flow diagram of a method for detection of a fault in a friction brake, such as depicted in FIGS. 1-3.

FIG. 4 depicts a method 200 of identifying a fault in the friction brake subassembly 62, which is part of the brake system 60 of the vehicle 10, as described above with respect to FIGS. 1-3. The method 200 commences in frame 202 with detecting movement of the vehicle 10 relative to the road surface 12. In frame 202 the method may also include detecting via the controller 84 a brake event via an initial application of the hydraulic brake pressure P and engagement of the friction brake subassembly 62. The method 200 then proceeds from frame 202 to frame 204. Such detection of vehicle 10 movement may be performed via the controller 84, for example using data from the third sensor(s) 90. In frame 204, the method includes detecting via the first sensor 80 vibration v at the road wheel 32A, 32B and communicating, by the first sensor to the controller 84, the signal 80A indicative of the detected vibration v. In frame 204, the method may also include detecting a rotational speed w of the road wheel 32A, 32B via the third sensor 90 and communicating, by the third sensor to the controller 84, the signal 90A indicative of the detected rotational speed of the respective road wheel.

Additionally, in frame 204, the method may include removing the trend $T_v$ from the data indicative of the detected vibration v via the dynamic moving average filter 92 using the data indicative of the detected rotational speed ω of the road wheel 32A, 32B, as described with respect to FIGS. 1-3. Furthermore, as also described above with respect to FIGS. 1-3, in frame 204, the method may include using Fourier transform methodology to assess the data indicative of the detected vibration in a frequency domain, following removing the trend $T_v$ from the data indicative of the detected vibration v in the hydraulic brake pressure P. The method 200 then proceeds from frame 204 to frame 206. In frame 206, the method includes detecting via the second sensor 82, upon application of a hydraulic brake pressure P, the variation in the hydraulic brake pressure. In frame 206, the method also includes communicating, by the second sensor 82 to the controller 84, the signal 82A indicative of the detected variation in the hydraulic brake pressure P. In frame 206, the method may additionally include removing the trend $T_p$ from the data indicative of the variation in the hydraulic brake pressure P via the dynamic moving average filter 94 using the data indicative of the detected rotational speed ω of the road wheel 32A, 32B. Following frame 206, the method 200 advances to frame 208.

In frame 208 the method 200 includes comparing, via the controller 84, the data indicative of the detected vibration v with a threshold vibration value $v_t$. After frame 208, the method 200 proceeds to frame 210. In frame 210, the method 200 includes comparing, via the controller 84, the data indicative of the detected variation in the hydraulic brake pressure P with a threshold hydraulic brake pressure value $P_t$. Following frame 210, the method 200 advances to frame 212. In frame 212 the method 200 includes generating, via the controller 84, the sensory signal 88 indicative of the fault in the friction brake subassembly 62 when the magnitude of the detected vibration is greater than the threshold vibration value $v_t$ and the magnitude of the detected variation in the hydraulic brake pressure P is greater than the threshold hydraulic brake pressure value $P_t$.

Between frames 204 and 212, the method may activate frame 205, wherein the method further includes detecting a noise in the vehicle interior 30, via the fourth sensor 96. In frame 205 the method may further include communicating, by the fourth sensor 96 to the controller 84, the signal 96A indicative of the detected noise, and identifying, via a machine learning technology 98 programmed into the controller 84 or the external controller 102, when the detected noise is generated by the fault in the friction brake subassembly 62. Following either frame 205 or frame 212, method 200 may return to frame 202, thus enabling repetition of the method algorithm in steps 202 through 212 for detection of a fault and prediction of a decrease in the stopping power of a specific friction brake subassembly 62 within the vehicle braking system 60. The method 200 may also terminate at frame 214.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A method of identifying a fault in a friction brake actuated by hydraulic brake pressure and configured to decelerate a road wheel of a vehicle having a vehicle body and an electronic controller, the method comprising:
   detecting, via a first sensor in communication with the electronic controller, a vibration at the road wheel and communicating, by the first sensor to the controller, data indicative of the detected vibration;
   detecting, via a second sensor in communication with the controller, upon application of a hydraulic brake, a variation in the hydraulic brake pressure resulting from the detected vibration, and communicating, by the second sensor to the controller, data resulting from the detected vibration and indicative of the detected variation in the hydraulic brake pressure;
   comparing, via the controller, the data indicative of the detected vibration with a threshold vibration value;
   comparing, via the controller, the data indicative of the detected variation in the hydraulic brake pressure with a threshold hydraulic brake pressure value; and
   generating, via the controller, a sensory signal indicative of a decrease in stopping power of the friction brake when a magnitude of the detected vibration is greater than the threshold vibration value and a magnitude of the detected variation in the hydraulic brake pressure is greater than the threshold hydraulic brake pressure value.

2. The method according to claim 1, further comprising detecting a rotational speed of the road wheel via a third sensor in communication with the controller, and communicating, by the third sensor to the controller, data indicative of the detected rotational speed of the road wheel.

3. The method according to claim 2, further comprising removing, via the controller, a trend from the data indicative of the detected vibration via a dynamic moving average filter using the data indicative of the detected rotational speed of the road wheel.

4. The method according to claim 3, further comprising, following removing the trend from the data indicative of the detected vibration, using a fast Fourier transform (FFT) algorithm to assess the data indicative of the detected vibration in a frequency domain.

5. The method according to claim 2, further comprising removing, via the controller, a trend from the data indicative of the variation in the hydraulic brake pressure via a dynamic moving average filter using the data indicative of the detected rotational speed of the road wheel.

6. The method according to claim 2, wherein the vehicle body defines a vehicle interior, the method further comprising detecting a noise either external to the vehicle body or in the vehicle interior, via a fourth sensor in communication with the controller, and communicating, by the fourth sensor to the controller, data indicative of the detected noise, and identifying, via a machine learning technology, when the detected noise is generated by the fault causing the decrease in stopping power in the friction brake.

7. The method according to claim 6, wherein each of detecting the vibration at the road wheel, detecting the variation in the hydraulic brake pressure, detecting the rotational speed of the road wheel, and detecting the noise is accomplished both before and after an initial application of the hydraulic brake pressure.

8. The method according to claim 7, wherein the data indicative of the detected variation in the hydraulic brake pressure and the data indicative of the detected vibration at the road wheel is respective steady state variation data and steady state vibration data communicated to the controller after the initial application of the hydraulic brake pressure.

9. The method according to claim 1, wherein the controller is a vehicle on-board electronic control unit (ECU) and is one of a plurality of controllers, wherein each controller is a respective ECU of one vehicle in a vehicle fleet, and wherein each generated sensory signal is communicated via the respective ECU to one of an external controller and an information technology (IT) cloud platform configured to coordinate and manage operation of the vehicle fleet.

10. The method according to claim 1, wherein the vehicle includes a plurality of road wheels and the friction brake is part of a vehicle brake system including a plurality of friction brakes, and each friction brake is configured to decelerate a respective one of the road wheels, and wherein the method further comprises identifying the friction brake having the fault among the plurality of friction brakes via comparing the detected vibration with the threshold vibration value and the data indicative of the detected variation in the hydraulic brake pressure with the threshold hydraulic brake pressure value for each of the plurality of friction brakes.

11. A vehicle comprising:
a vehicle body;
a road wheel operatively connected to the vehicle body;
a friction brake actuated by hydraulic brake pressure and configured to retard rotation of the road wheel and thereby decelerate the vehicle;
a first sensor configured to detect a vibration at the road wheel;
a second sensor configured to detect a variation in the hydraulic brake pressure; and
an electronic controller in communication with each of the first and second sensors and configured to:
receive, from the first sensor, data indicative of the detected vibration at the road wheel;
receive, from the second sensor, upon application of a brake force configured to engage the friction brake, data resulting from the detected vibration and indicative of the detected variation in the hydraulic brake pressure;
compare the data indicative of the detected vibration with a threshold vibration value;
compare the data indicative of the detected variation in the hydraulic brake pressure with a threshold hydraulic brake pressure value; and
generate a sensory signal indicative of a decrease in stopping power of the friction brake
when a magnitude of the detected vibration is greater than the threshold vibration value and a magnitude of the detected variation in the hydraulic brake pressure is greater than the threshold hydraulic brake pressure value.

12. The vehicle according to claim 11, further comprising a third sensor configured to detect a rotational speed of the road wheel, wherein the controller is additionally configured to receive, from the third sensor, data indicative of the detected rotational speed of the road wheel.

13. The vehicle according to claim 12, wherein the controller is additionally configured to remove a trend from the data indicative of the detected vibration via a dynamic moving average filter using the data indicative of the detected rotational speed of the road wheel.

14. The vehicle according to claim 13, wherein the controller is additionally configured to, following removing the trend from the data indicative of the detected vibration, use a fast Fourier transform (FFT) algorithm to assess the data indicative of the detected vibration in a frequency domain.

15. The vehicle according to claim 12, wherein the controller is additionally configured to remove a trend from the data indicative of the variation in the hydraulic brake pressure via a dynamic moving average filter using the data indicative of the detected rotational speed of the road wheel.

16. The vehicle according to claim 12, wherein the vehicle body defines a vehicle interior, the vehicle further comprising a fourth sensor in communication with the controller and configured to detect a noise either external to the vehicle body or in the vehicle interior, and wherein the controller is additionally configured to receive, from the fourth sensor, data indicative of the detected noise, and identify, via a machine learning technology, when the detected noise is generated by the fault causing the decrease in stopping power in the friction brake.

17. The vehicle according to claim 16, wherein the controller is configured to detect each of the vibration at the road wheel, the variation in the hydraulic brake pressure, the rotational speed of the road wheel, and the noise both before and after an initial application of the hydraulic brake pressure.

18. The vehicle according to claim 17, wherein the data indicative of the detected variation in the hydraulic brake pressure and the data indicative of the detected vibration at the road wheel is respective steady state variation data and steady state vibration data received by the controller after the initial application of the hydraulic brake pressure.

19. The vehicle according to claim 11, wherein the controller is a vehicle on-board electronic control unit (ECU) and is one of a plurality of controllers, wherein each controller is a respective ECU of one vehicle in a vehicle fleet, and wherein each ECU is configured to communicate the generated sensory signal to one of an external controller and an information technology (IT) cloud platform configured to coordinate and manage operation of the vehicle fleet.

20. The vehicle according to claim 11, further comprising a plurality of road wheels and wherein the friction brake is part of a vehicle brake system including a plurality of friction brakes, and each friction brake is configured to decelerate a respective one of the road wheels, and wherein the controller is configured to identify the friction brake having the fault among the plurality of friction brakes by comparing the detected vibration with the threshold vibration value and comparing the data indicative of the detected variation in the hydraulic brake pressure with the threshold hydraulic brake pressure value for each of the plurality of friction brakes.

* * * * *